United States Patent
Nakata

(10) Patent No.: US 8,262,135 B2
(45) Date of Patent: Sep. 11, 2012

(54) DUPLEX PIPE FITTING, EXCLUSIVE TOOL FOR THE DUPLEX PIPE FITTING, REFRIGERATION SYSTEM EMPLOYING THE DUPLEX PIPE FITTING, AND SEPARATION TYPE AIR CONDITIONER

(75) Inventor: Haruo Nakata, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 325 days.

(21) Appl. No.: 12/677,252

(22) PCT Filed: Sep. 8, 2008

(86) PCT No.: PCT/JP2008/066178
§ 371 (c)(1),
(2), (4) Date: Mar. 9, 2010

(87) PCT Pub. No.: WO2009/034948
PCT Pub. Date: Mar. 19, 2009

(65) Prior Publication Data
US 2011/0006517 A1    Jan. 13, 2011

(30) Foreign Application Priority Data

Sep. 11, 2007 (JP) ................................. 2007-235990
Aug. 19, 2008 (JP) ................................. 2008-211013

(51) Int. Cl.
*F16L 19/08* (2006.01)
(52) U.S. Cl. ................................ 285/3; 285/39; 285/342
(58) Field of Classification Search .................. 285/3, 4, 285/342, 39
See application file for complete search history.

(56) References Cited

U.S. PATENT DOCUMENTS

| | | | | | |
|---|---|---|---|---|---|
| 4,575,274 | A | * | 3/1986 | Hayward | 285/323 |
| 4,789,759 | A | * | 12/1988 | Jones | 285/3 |
| 4,836,584 | A | * | 6/1989 | Baker | 285/351 |
| 4,848,808 | A | * | 7/1989 | Pannell et al. | 285/4 |
| 4,930,816 | A | * | 6/1990 | Biing-Yih | 285/39 |
| 5,052,719 | A | * | 10/1991 | Boehm | 285/4 |
| 5,362,109 | A | * | 11/1994 | Pacht | 285/39 |
| 5,658,017 | A | * | 8/1997 | Chirehdast et al. | 285/4 |
| 5,772,252 | A | * | 6/1998 | Malani | 285/4 |
| 7,862,089 | B2 | * | 1/2011 | Crompton | 285/39 |
| 7,900,967 | B2 | * | 3/2011 | Jensen et al. | 285/4 |
| 7,988,206 | B2 | * | 8/2011 | Nakata et al. | 285/3 |

(Continued)

FOREIGN PATENT DOCUMENTS

EP    0719974 A1    7/1996

(Continued)

*Primary Examiner* — David E Bochna
(74) *Attorney, Agent, or Firm* — Birch, Stewart, Kolasch & Birch, LLP

(57) ABSTRACT

A duplex pipe fitting includes a fitting main body 1 and a pair of coupling members 2 which are threaded to both ends of the fitting main body 1. The coupling members 2 are threaded to the fitting main body 1, so that two pipes P are connected to each other with the fitting main body 1. Each coupling member 2 includes a holding portion 24 including a holding surface consisting of a pair of or a plurality of pairs of planes facing each other so that it can be held with a general fastening tool. When a rotational torque for tightening the coupling member 2 to the fitting main body 1 reaches a value indicating the completion of fastening, at least a part of the holding portion including the holding surface is separated and the pipe connecting is complete.

8 Claims, 13 Drawing Sheets

U.S. PATENT DOCUMENTS

2006/0138771 A1 * 6/2006 Galante et al. ............... 285/249

FOREIGN PATENT DOCUMENTS

| JP | 4-362391 A | 12/1992 |
| JP | 7-293761 A | 11/1995 |
| JP | 8-200566 A | 8/1996 |
| JP | 11-141921 A | 5/1999 |
| JP | 2006-207795 A | 8/2006 |
| JP | 2007-120741 A | 5/2007 |
| JP | 2007-211847 A | 8/2007 |

* cited by examiner

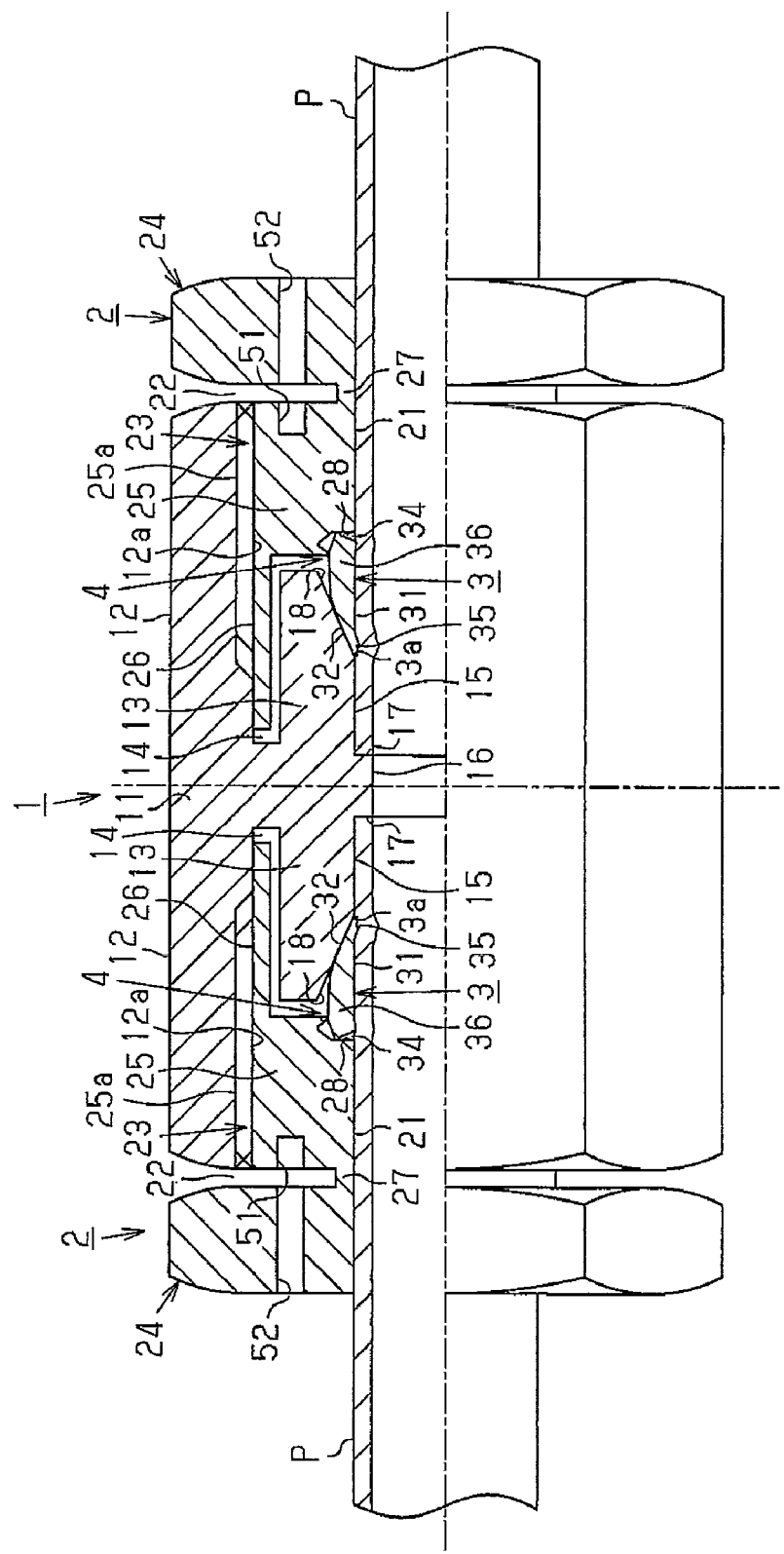

DUPLEX PIPE FITTING, EXCLUSIVE TOOL FOR THE DUPLEX PIPE FITTING, REFRIGERATION SYSTEM EMPLOYING THE DUPLEX PIPE FITTING, AND SEPARATION TYPE AIR CONDITIONER

TECHNICAL FIELD

The present invention relates to a duplex pipe fitting having a thread portion at either end, and more particularly, to a duplex pipe fitting having a connecting structure that cannot be easily disassembled after pipes are connected thereto.

BACKGROUND ART

As one type of pipe fittings used for fluid pipes through which fluid is passed, a simplex pipe fitting has been known that includes a first end and a second end. The first end has a pipe connecting port, to which a pipe is connected by brazing. The second end has a thread portion, to which a pipe is connected by threading a coupling member (nut), or by through screwing. Duplex pipe fittings are also known, which have a thread potion at either end, to which a pipe is connected by threading a coupling member (nut). FIG. 13 shows an example of piping for a separation type air conditioner using the latter duplex pipe fitting, which is disclosed in Patent Document 1.

As shown in FIG. 13, a pipe 102 is drawn to the outside from an indoor heat exchanger mounted in an indoor unit 101 of a prior art separation type air conditioner, and the distal end of the pipe 102 is connected to a flare type simplex pipe fitting 103. The simplex pipe fitting 103 is provided as a connecting portion of the indoor unit 101. Also, an outdoor unit 105 has a flare type simplex pipe fitting 106 serving as a connecting portion. A first connecting pipe (communication pipe) 104 and a second connecting pipe 107 are connected to the inside and outside connecting portions, and the first connecting pipe 104 and the second connecting pipe 107 are connected to each other at their distal ends. In this manner, the indoor unit 101 and the outdoor unit 105 are connected to each other with the first and second connecting pipes 104, 107. In this case, a bite type duplex pipe fitting 108 is used for connecting the first connecting pipe 104 and the second connecting pipe 107 to each other. As an example of conventional duplex pipe fittings, Patent Document 2 discloses a specific structure of a duplex pipe fitting in addition to Patent Document 1. Specifically, the duplex pipe fitting disclosed in Patent Document 2 includes a fitting body having a thread portion to be connected to a pipe at either end, two nuts threaded to the thread portion, and sleeves accommodated in the nuts.

The simplex pipe fittings 103, 106 and the duplex pipe fitting 108, which are used in the above example of piping, are installed by tightening the coupling members (nuts in some cases) with fastening tools. The fastening is continuously executed until the tightening torque reaches a value that indicates the completion of fastening. When the tightening torque reaches the completion indicating value, the fastening is finished, and the pipe connecting is ended. After the completion of the pipe connecting, the first and second connecting pipes 104, 107 and the pipe fittings 103, 106, 108 are used without being changed. Therefore, after the completion of pipe connecting, anybody can easily loosen a screwed part of the pipe fittings 103, 106, 108 using a general fastening tool such as a spanner or a wrench. Accordingly, by loosening the pipe fittings, the pipes 104, 107 can be removed easily by any person.

However, recently, the handling of chlorofluorocarbon gas, which is in heavy usage as refrigerants of refrigeration apparatuses, has become stricter year by year. This is because chlorofluorocarbon gas is a factor of generating problems of ozone layer destruction, global warming and the like when discharged into the atmosphere. In recent years, a structure of pipe fittings that cannot be easily disassembled has been needed for parts to which pipes are connected with pipe fittings.

In FIG. 13, if the indoor unit 101 is located above the ceiling, a pipe fitting having a structure that cannot be easily loosened is desired. However, no suitable pipe fittings exist that meet such demands. That is, no suitable pipe fitting that connects the pipe 102 drawn from the indoor unit 101 to the first connecting pipe 104 exists. If the indoor unit 101 is installed above the ceiling by means of brazing, all possible measures must be taken to ensure fire prevention.

Patent Document 1: Japanese Laid-Open Patent Publication No. 11-141921
Patent Document 2: Japanese Laid-Open Patent Publication No. 2007-120741

DISCLOSURE OF THE INVENTION

Accordingly, it is an objective of the present invention to provide a duplex pipe fitting that cannot be loosened using a general fastening tool after pipe connecting is complete. Another objective of the present invention is to provide a specialized tool for loosening thread portions of the duplex pipe fitting and to provide a refrigeration system and an air conditioner each employing the duplex pipe fitting.

To achieve the foregoing objective and in accordance with one aspect of the present invention, a duplex pipe fitting is provided that includes a fitting main body having a pair of first thread portions and a pair of coupling members having second thread portions which are threaded to the respective first thread portions of the fitting main body while being attached to pipes to be connected to the fitting main body. Each of the coupling member is threaded to the fitting main body so that two pipes are connected to each other with the fitting main body. Each of the coupling members has a holding portion including a holding surface formed of a pair of or a plurality of pairs of planes facing each other. The holding portion is capable of being held with a general fastening tool. At least a part of the holding portion including the holding surface is separated in the course of pipe connecting.

"Separation" includes the following cases. (1) A case where an integrally formed portion is cut or broken. (2) A case where parts that have been separately formed are joined by engaging means such as adhesion or engagement are cut or broken at the joint portion. (3) A case where parts that are engaged with each other under normal use conditions, but are disengaged under a certain condition are disengaged under the certain condition. The last case (3) includes a case where, when the rotational torque for tightening the coupling member to the fitting main body reaches a value indicating the completion of fastening, the coupling mechanism formed between a holding surface and the thread portion operates such that the rotational torque is no longer transmitted from the holding surface to the thread portion.

The duplex pipe fitting according to the present invention having such structural characteristics allows a pipe to be connected to each end of a fitting main body that has a threaded portion at either end in the axial direction. Also, since at least a part of the holding portion that includes the holding surface is formed by the separation in the course of the pipe connecting, general fastening tools can be no longer used after the pipe connecting is complete. Therefore, the thread portions of the pipe fitting cannot be easily loosened, and the pipes cannot be easily removed by loosening the thread portions. As a result, inadvertent leakage and discharge of refrigerant gas into the atmosphere are prevented. Further, in a case where the thread portions of the fitting main body and the coupling member need to be loosened, such loosening has to be performed by a specialist. This reduces the unwanted discharging of chlorofluorocarbon gas into the atmosphere.

The part including the holding surface can be configured to be separated when a rotational torque for tightening the coupling member to the fitting main body reaches a value indicating the completion of fastening. In this case, the strength of the parts to be separated needs to be set in accordance with the rotational torque. Since the portion including the holding surface is separated at the same time as the fastening of the coupling member is finished, the fastening operation is simplified. When the portion including the holding surface is separated, the rotational torque abruptly drops. Thus, the worker should be watchful about such a torque drop.

The coupling member preferably includes a pipe through hole extending along a central axis, a slit formed on the entire circumference of the coupling member in such a manner as to divide the coupling member into two parts, and a thin-wall tubular coupling portion formed between the slit and the pipe through hole. A portion of the coupling member that is on a side opposite to the fitting main body of the slit is formed as the holding portion, and a portion of the coupling member that is on the same side as the fitting main body of the slit is formed as a pipe connecting portion. The pipe connecting portion includes the thread portions that are threaded to the fitting main body and constituting a pipe connecting mechanism for hermetically joining the fitting main body and the pipe. The part including the holding surface is separated at the tubular coupling portion when the rotational torque for tightening the coupling member to the fitting main body reaches the value indicating the completion of fastening.

In this configuration, when the rotational torque for tightening the coupling member reaches the value indicating the completion of fastening, the entire holding portion, which is held with a general fastening tool, is separated from the pipe connecting portion threaded to the fitting main body, so that the fastening process of the coupling member is finished. Therefore, after the pipes are connected, the pipe connecting portion, which is threaded to the fitting main body, cannot be easily removed. Although the holding portion becomes movable freely on the pipe, this causes no particular problem.

Also, in this case, the fitting main body preferably has a cylindrical portion in which the entire pipe connecting portion is accommodated in a state after the fastening is complete, and the coupling member is preferably located at a position where the slit substantially coincides with the end of the cylindrical portion in a state after the fastening is complete. In this configuration, the tubular coupling portion is cut at the same time when the fastening process of the coupling member is complete, so that the entire pipe connecting portion is accommodated in the fitting main body, and the holding portion is separated. Therefore, the thread portion is more reliably prevented from being easily loosened, for example, to remove the pipe, by anybody.

Further, a plurality of engaging holes are preferably formed on an end face opposite to the fitting main body of the pipe connecting portion. In this configuration, the pipe connecting portion is easily loosened by using the specialized tool having engaging projections engaged with the engaging holes. The engaging holes are formed as engaging portions with which the specialized tool is engaged, but do not project with respect to the slit. This allows the width of the slit to be reduced, so that the pipe fitting is compact.

The plurality of engaging holes are preferably formed in such a manner as to extend in the axial direction, and a plurality of machining holes used for machining the plurality of engaging holes preferably pass through the holding portion. The machining holes are formed at positions corresponding to the engaging holes on the holding portion. In this configuration, despite the existence of the holding portion, the engaging hole can be formed from a side of the holding body opposite to the fitting main body. Also, since the inner diameter of the machining hole is the same as the inner diameter of the engaging hole, these holes can be formed simultaneously.

The plurality of engaging holes are preferably spaced at equal intervals on a circumference. In this configuration, when the specialized tool having engaging projections to be engaged with the engaging holes is used, the engaging projection of the specialized tool can be engaged with the engaging hole. The specialized tool is easy to use.

Also, the specialized tool of the present invention has engaging holes formed on an end face of the pipe connecting portion opposite to the fitting main body as described above, and is used for a duplex pipe fitting. The specialized tool is characterized by a generally semi-annular shaped base body which has an inner diameter larger than the outer diameter of the pipe, a handle attached to the base body, and engaging projections formed on the side face of the base body, which are engaged with the engaging holes. Therefore, by using the specialized tool, the pipe connecting portion, to which the fitting main body is threaded, can be removed without removing the holding portion from the pipe. The piping can be easily redone.

According to another aspect of the present invention, a refrigeration system using the above described duplex pipe fitting in a refrigerant circuit is provided. Thus, the durability of the refrigeration system is improved.

In accordance with another aspect of the present invention, a separation type air conditioner is provided. An indoor unit installed in a room and an outdoor unit installed outside a room are connected to each other with a communication pipe installed on site, and the air conditioner is characterized in that the above described duplex pipe fitting is used for connection of the communication pipe. In this configuration, when the indoor unit and the outdoor unit are connected by the communication pipe, the pipe cannot be easily disassembled after being installed.

In accordance with another aspect of the present invention, a separation type air conditioner is provided, in which an indoor unit installed above a ceiling and an outdoor unit installed outside a room are connected to each other with a communication pipe installed on site. The air conditioner is characterized in that the communication pipe is connected above the ceiling with the above described duplex pipe fitting. In this configuration, the indoor unit and the communication pipe can be connected above the ceiling using the above described duplex pipe fitting, without brazing, in such a manner that the pipes cannot be easily disassembled.

BRIEF DESCRIPTION OF THE DRAWINGS

FIG. 3 are cross-sectional views illustrating the ferrule and its surroundings during the fastening process of the duplex pipe fitting of FIG. 1, where

FIG. 4 is a partial cross-sectional view illustrating a state immediately before the fastening of the duplex pipe fitting shown in FIG. 1 is complete;

BEST MODE FOR CARRYING OUT THE INVENTION

First Embodiment

Figure 1:
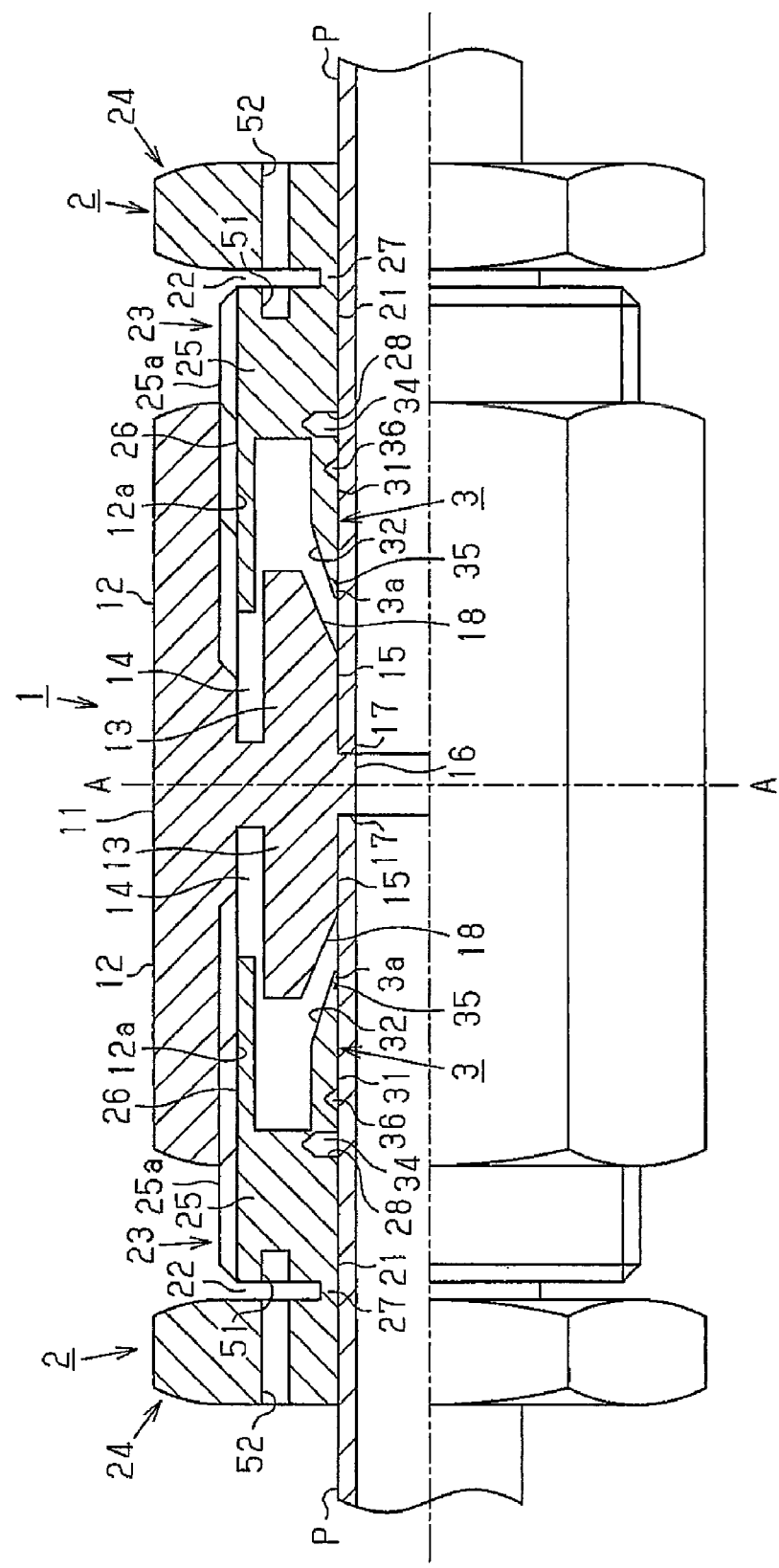
FIG. 1 is a partial cross-sectional view of a duplex pipe fitting according to a first embodiment of the present invention, showing a state before fastening is started.

A pipe fitting according to a first embodiment will now be described with reference to FIGS. 1 to 6. The pipe fitting of the first embodiment is a duplex pipe fitting used in a refrigerant circuit of a refrigerating device used, for example, as a heat pump type water heating device. FIG. 1 is a partial cross-sectional view illustrating a state immediately before the fastening of the duplex piping is started.

This duplex pipe fitting 1 includes, as shown in FIG. 1, a fitting main body 1 that has internal threads 12a as first thread portions at both ends in the axial direction, two coupling members 2 that have external threads 25a as second thread portions threaded to the internal threads 12a of the fitting main body and ferrules 3 integrally formed on the coupling members 2. Each coupling member 2 is attached to one of a pair of pipes P connected by the fitting main body 1.

Also, this duplex pipe fitting is formed symmetrically with respect to the radial center line A-A of the fitting main body 1. Therefore, the description below includes only the explanation about the coupling member 2 and the ferrule 3 on the right side and their functions. Explanation about the configuration of the left side is omitted in order to avoid overlap. Further, in the explanation of the configuration of the right side, the side corresponding to the fitting main body 1, that is, the left side in FIG. 1, is referred to as the front side, while the side corresponding to the coupling member 2, that is, the right side in FIG. 1, is referred to as the rear side. The same applies to the other embodiments described later.

The fitting main body 1 has a symmetrical shape with respect to center line A-A as shown in FIG. 1. The fitting main body 1 has a base portion 11 on its central part and bite type pipe connecting structures for connecting pipes P formed at both ends of the fitting main body 1. Therefore, on both sides of the base portion 11, internal thread cylindrical portions 12 are formed, which have, on their inner circumferential surface, the internal threads 12a as the first thread portions to which the coupling members 2 are threaded. The base portion 11 and the internal thread cylindrical portions 12 at both sides are integrally formed into a hexagon nut shape. Therefore, the base portion 11 and the internal thread cylindrical portions 12 are easily held with a general tool.

Also, the fitting main body 1 has two bosses 13 projecting from both sides of the base portion 11 into the respective internal thread cylindrical portions 12. On the outer circumferential surface of each boss 13, an annular space 14 in which a protective cylindrical portion 26 of the coupling member 2 is inserted is formed. Also, on the inner circumferential surface of each boss 13 extending from the boss 13 to the base portion 11, an insertion port 15 is formed, in which a pipe P is inserted at the time of pipe connecting. In addition, a communication hole 16 is formed between the insertion ports 15 on both sides. Between the insertion port 15 and the communication hole 16, a step (counter bore) 17 is formed. By causing the distal end of the pipe P inserted in the insertion port 15 to contact the step 17, the pipe P is held at a predetermined position.

Also, at the entrance of each insertion port 15, a cam surface 18 is formed. Each cam surface 18 is continuous to the insertion port 15 on the side corresponding to the base portion 11 and formed like a cone with its diameter increasing toward the rear side (toward the coupling member 2). The inclination angle of the cam surface 18 relative to the central axis of the pipe fitting is formed so as to be greater than that of the tapered surface 32 of the distal end of the ferrule 3 described later.

As mentioned above, two coupling members 2 are threaded to both ends of the fitting main body 1, respectively. These coupling members 2 have the same structure and are attached in mutually opposite orientations. The coupling members 2 will now be explained below. Since the coupling members 2 on both sides have the same structure, only the coupling member threaded to the right side in FIG. 1 will be explained as mentioned above.

The coupling member 2 has a pipe through hole 21 in the central axis, through which the pipe P is passed, as shown in FIG. 1. On the coupling member 2, a slit 22 having a U-shaped cross section is formed on the entire circumference of the coupling member 2 in such a manner as to divide the coupling member 2. On the side corresponding to the fitting main body 1 (front side) of the slit 22, a pipe connecting portion 23 which is threaded to the fitting main body 1 and has a pipe connecting mechanism is formed. On a side of the slit 22 opposite to the fitting main body 1 (rear side), a holding portion 24 which can be held with a general fastening tool is formed. The position in the axial direction of the slit 22 substantially coincides with the end portion of the fitting main body 1, that is, the internal thread cylindrical portion 12 forming a tubular portion, in a state where the coupling member 2 is fastened to the fitting main body 1 (see FIGS. 4 and 5).

The pipe connecting portion 23 also includes a base portion 25. On the outer circumferential surface of the side corresponding to the fitting main body 1 (front side) of the base portion 25, a protective cylindrical portion 26 for protecting a ferrule 3 is formed. On the outer circumferential surface from the protective cylindrical portion 26 to the base portion 25, an external thread 25a serving as a second thread portion to which the fitting main body 1 is threaded is formed.

Also, the holding portion 24 is formed into a hexagon nut shape so that it can be held with a general fastening tool. Between the slit 22 and the pipe through hole 21, a thin-wall tubular coupling portion 27 is formed. The pipe connecting portion 23 and the holding portion 24 are connected to each other with the tubular coupling portion 27. The tubular coupling portion 27 is designed to have such a strength that it is cut when the tightening torque of the coupling member 2 for tightening the holding portion 24 reaches a value indicating the completion of fastening. The pipe connecting mechanism in this embodiment includes members such as the above-described ferrule 3, the external thread 25a, and the internal thread 12a.

On the side opposite to the fitting main body 1 (rear side) of the pipe connecting portion 23, four engaging holes 51 which are circular and have a predetermined depth are formed. These engaging holes 51 function as a portion that is engaged with an engaging portion of a specialized tool described later. On the holding portion 24, four machining holes 52 are formed, which enable the engaging holes 51 to be machined from the side corresponding to the fitting main body 1 (rear side) of the holding portion 24. Each machining hole 52 is formed at a position facing each corresponding engaging hole 51 and spaced at equal intervals on a circumference.

Figure 2:
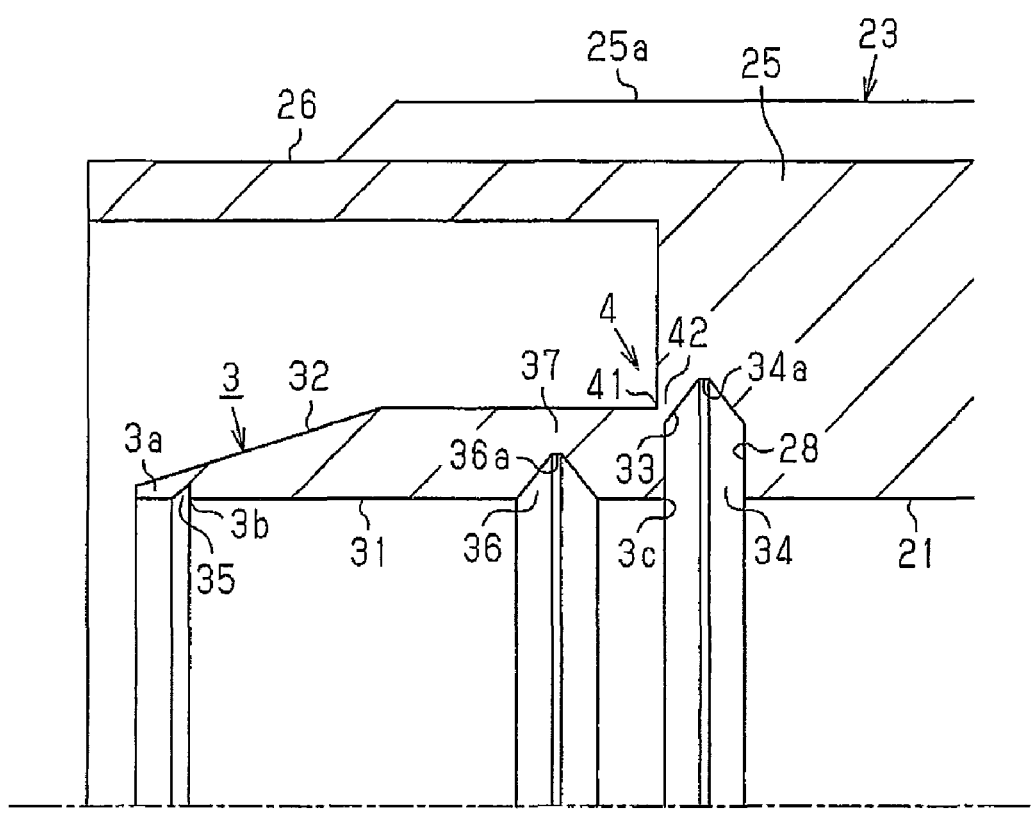
FIG. 2 is an enlarged cross-sectional view illustrating the ferrule and its surroundings in the duplex pipe coupling shown in FIG. 1.

As shown in FIG. 2, the ferrule 3 is formed in an annular shape having a through hole 31, through which the pipe P is passed, at its central axis and connected to the base portion 25 with a thin-wall portion 4 extending in the radial direction at its rear end. The ferrule 3 is integrally formed with the coupling member 2.

Also, as shown in FIG. 2, the ferrule 3 has a rear portion having a substantially constant wall thickness and a front portion having a tapered surface 32 on its outer circumference. The ferrule 3 is formed so that the tapered surface 32 tapers down toward the distal end. The inclination angle of the tapered surface 32 is set to be a little smaller than that of the above-mentioned cam surface 18. The rear surface 33 of the ferrule 3 is formed in such a manner as to face a pressing surface 28 formed on the base portion 25 via a first notch 34 which is recessed radially outward from the inner circumferential side. The first notch 34 has a generally V-shaped cross section. The first notch 34 includes a pair of wall surfaces which extend in the direction orthogonal to the central shaft line of the base portion 25 and face each other in the front and rear directions, respectively. A largest inner circumferential portion 34a of the first notch 34 is located on the cylindrical surface which has a shorter axial length.

On the other hand, the outer circumference of the ferrule 3 and the front side of the thin-wall portion 4 (that is, the proximal side of the ferrule 3) are connected substantially at a right angle, as shown in FIG. 2. The right-angle corner portion is formed as an incision 41 at the thin-wall portion 4. At the portion forming the incision 41, a thinnest wall portion 42 whose thickness is locally small is formed. Therefore, when an axial force acts on the coupling member 2, stress concentrates on the thinnest wall portion 42.

On the inner circumferential surface in the vicinity of a distal end 3a of the ferrule 3, a second notch 35 is provided. On the inner circumferential surface closer to the rear end of the ferrule 3, a third notch 36 is provided. The second notch 35 is provided to facilitate deformation of the distal end 3a of the ferrule 3. The second notch 35 has a V-shaped cross section and is located on a plane where the rear cutting surface is orthogonal to the central axis. In a case where the coupling member 2 is tightened manually, the pipe P can be temporarily held by inserting the distal end 3a of the second notch 35, in a wedge-like fashion, between the pipe P and the insertion port 15. Also, the crossing portion of the rear cutting surface and the inner circumferential surface of the second notch 35 forms an edge portion 3b. The edge portion 3b bends, thereby allowing the distal end 3a of the ferrule 3 to bite into the pipe P (see FIG. 3(c)).

The third notch 36 has a cross sectional which is substantially identical to that of the first notch 34. By formation of the third notch 36, an annular thin-wall portion 37 (see FIG. 2) is formed between the innermost portion of the third notch 36 and the outer circumference of the rear part of the ferrule 3. In this manner, the third notch 36 is formed and the annular thin-wall portion 37 is formed, so that the edge portion 3b of the distal end 3a of the ferrule 3 is deformed in such a manner as to bite into the pipe P and an edge portion 3c that forms the inner circumferential edge of the rear surface 33 is deformed in such a manner as to bite into the pipe P. Consequently, the entire ferrule 3 is deformed at both ends toward the central axis with the third notch 36 interposed between them (see FIG. 3(c)). In addition to biting of the edge portion 3b at the distal end 3a of the ferrule 3, the edge portion 3c at the rear end of the ferrule 3 is deformed in such a manner as to bite into the pipe P in order: (1) to hold the pipe P so that it is not disconnected, (2) to prevent vibration transmitted to the pipe P from being transmitted to the edge portion 3b, and (3) to maintain a high sealing performance and pipe retaining performance by biting of the edge portion 3b at the distal end 3a.

In the above configuration, the pipe P is made of copper and the fitting main body 1, the coupling member 2 and the ferrule 3 are made of brass materials. The above materials are most suitable for refrigeration systems and have general versatility.

Next, the method for connecting pipes of this duplex pipe fitting having the above-mentioned configuration will now be described with reference to FIG. 1 and FIGS. 3 to 6. The pipe connection on the right side and the pipe connection on the left side shown in FIG. 1 are the same, except that they are conducted symmetrically. Therefore, in the description below, the pipe connecting on the right side will be explained.

The method for connecting the pipe P using this duplex pipe fitting will be described. First, the pipe P is inserted into the pipe through hole 21 of the coupling member 2 to attach the coupling member 2 to the pipe P. Then, the distal end of the pipe P is inserted into the insertion port 15 through the through hole 31 of the ferrule 3, and the coupling member 2 is threaded to the fitting main body 1 with the distal end of the pipe P contacting the step 17. This state is shown in FIG. 1.

Figure 3A:
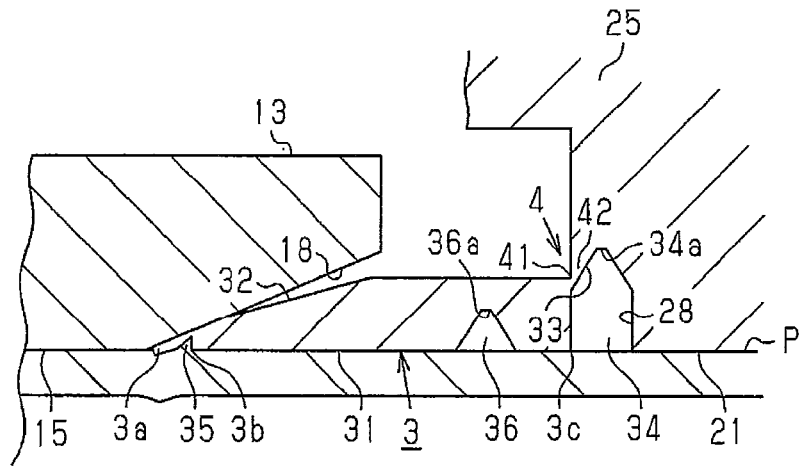
FIG. 3(a) shows a state of temporary joint in which the distal end of the ferrule is caused to bite into the pipe by manual fastening.
Figure 3B:
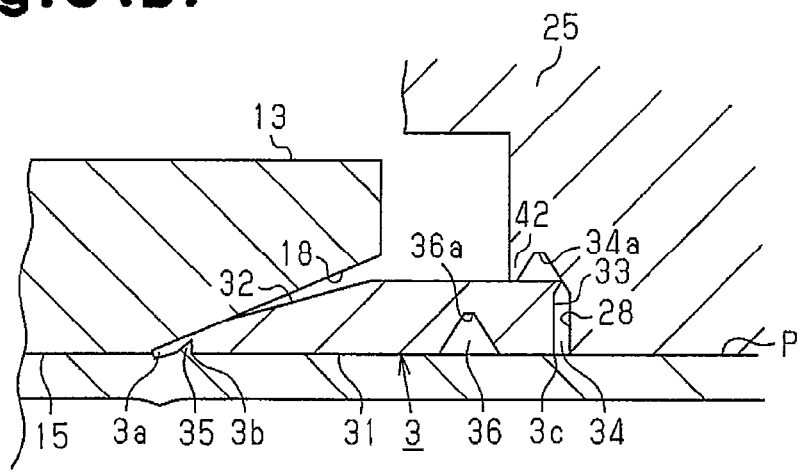
FIG. 3(b) shows a state in which the ferrule is separated from the coupling member.
Figure 3C:
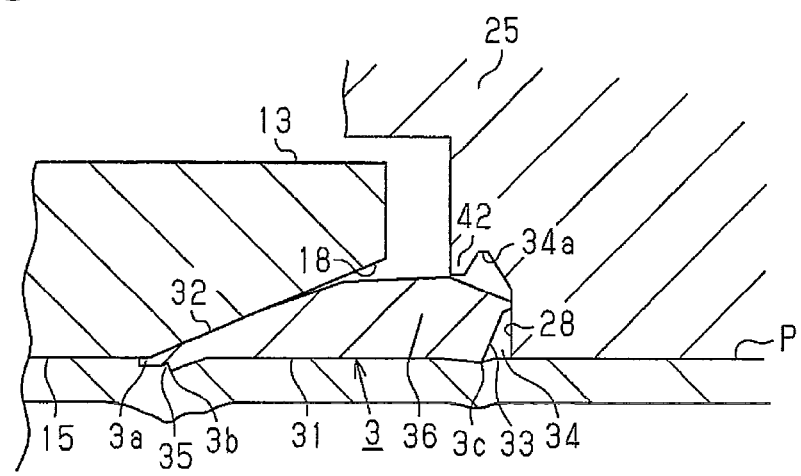
FIG. 3(c) shows a state where the fastening is complete.

From this state, the coupling member 2 is tightened manually, so that the distal end 3a of the ferrule 3 contacts the cam surface 18. If the coupling member 2 is further tightened from this state, the distal end 3a of the ferrule 3 is pressed in between the pipe P and the insertion port 15 and the pipe P is temporarily held. This state is shown in FIG. 3(a).

Thereafter, the tapered surface 32 at the front side of the second notch 35 of the ferrule 3 contacts the cam surface 18, and a larger rotational torque is required for further tightening of the coupling member 2. Therefore, in the subsequent processes, a general fastening tool is used to tighten the coupling member 2 to the fitting main body 1. As with the conventional cases, in the above tightening process, the coupling member 2 is tightened with the distal end 3a of the ferrule 3 pressed against the cam surface 18, so that a forward force in the axial direction acts on the thin-wall portion 4. At this time, stress concentrates on the crossing portion of the outer circumferential surface of the ferrule 3 and the front surface of the thin-wall portion 4, that is, the thinnest wall portion 42 having an incision 41 (see FIG. 3(a)). As a result, the thin-wall portion 4 is cut at the thinnest wall portion 42, and the outer circumferential end which is continuous with the rear surface 33 contacts the pressing surface 28 (see FIG. 3(b)).

Thereafter, the ferrule 3 operates as an independent ferrule. In other words, when the coupling member 2 is further tightened from the state where the cut end on the outer circumferential side continuous with the rear surface 33 is pressed by the pressing surface 28, the ferrule 3 is easily bent around the third notch 36 at its front and rear portions toward the central axis, because the part of the pressing surface 28 is formed as an inclined surface extending rearward from the largest inner circumferential portion 34a. Therefore, at the front portion of the third notch 36, the edge portion 3b is inclined around the third notch 36 in such a manner as to bite into the pipe P. In contrast, at the rear portion of the third notch 36, the edge portion 3c on the inner circumferential side of the rear surface 33 is inclined around the third notch 36 in such a manner as to bite into the pipe P (see FIG. 3(c)).

Furthermore, the rear portion of the ferrule 3 is deformed in such a manner as to be inclined around the third notch 36, so that the edge portion 3c bites into the pipe P. The third notch 36 is shaped so that the front surface and the rear surface forming the third notch 36 contact each other on their substantially entire surface to close the notch when the biting amount reaches a proper value. The shape is as mentioned above and has a generally V-shape as in the case with the first notch 34 as shown in the enlarged view of FIG. 2. At the innermost portion, included is a narrow cylindrical surface 36a. Accordingly, in the ferrule 3 according to the first embodiment, after the front surface and the rear surface forming the third notch 36 contact each other on their substantially entire surfaces, the inclination around the third notch 36 is regulated to prevent an excessive biting of the edge portion 3c.

Figure 5:
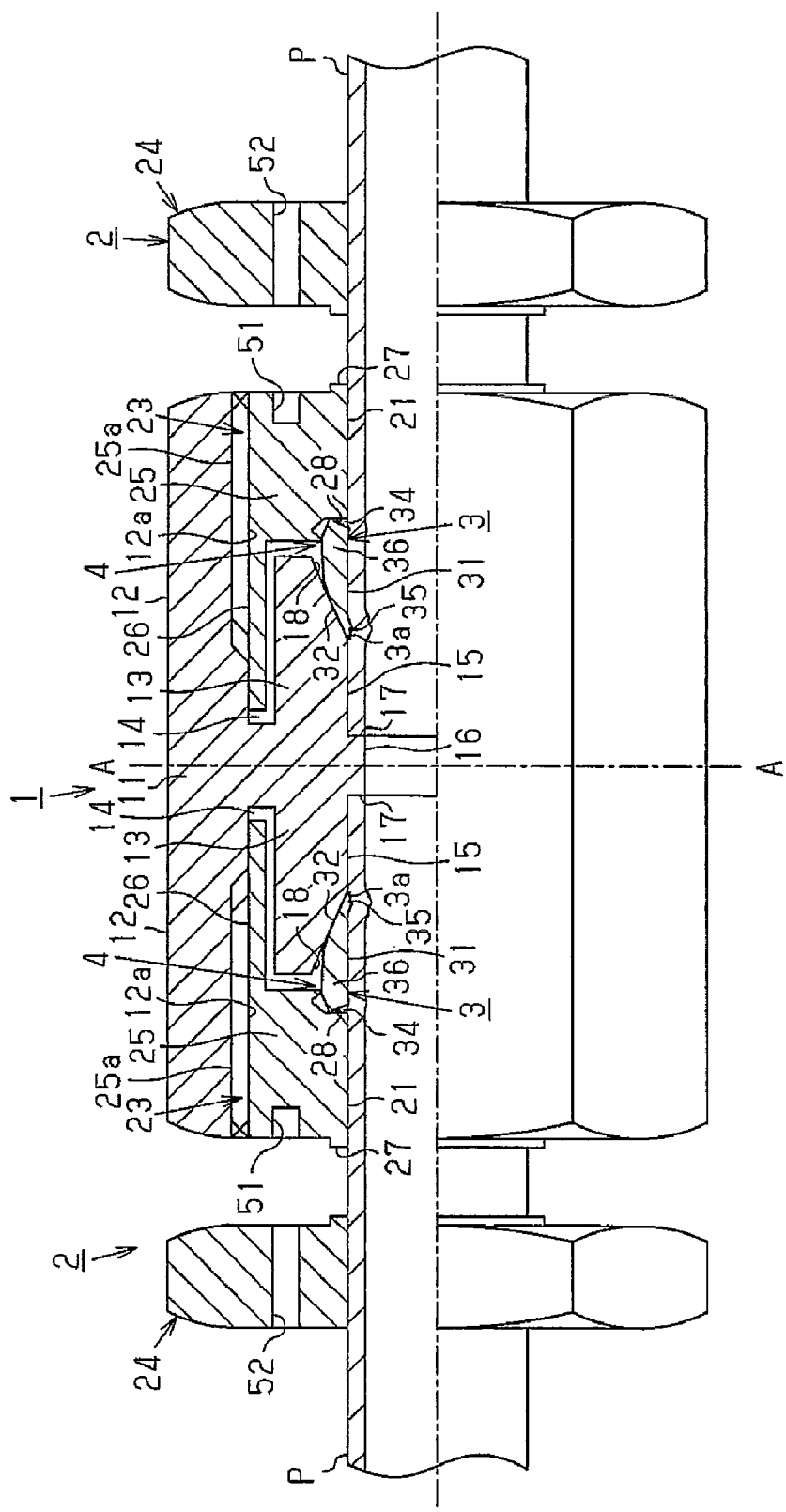
FIG. 5 is a partial cross-sectional view illustrating a state after the fastening of the duplex pipe fitting shown in FIG. 1 is complete.

In this manner, the slit 22 is positioned so that the end of the internal thread cylindrical portion 12 of the fitting main body 1 and the side corresponding to the fitting main body 1 of the slit 22 substantially coincide with each other as shown in FIG. 4 when the bite amount of the edge portion 3b at the distal end 3a of the ferrule 3 and the bite amount of the edge portion 3c at the rear end portion of the ferrule 3 reach predetermined levels. When the coupling member 2 is further tightened, the rotational torque for tightening the coupling member 2 reaches a value indicating the completion of fastening, as shown in FIG. 5. Then, the tubular coupling portion 27 is cut, and the holding portion 24 which projects from the internal thread cylindrical portion 12 of the fitting main body 1 is separated. Thus, tightening of the coupling member 2 is complete and connection of the pipe P is complete.

Figure 6:
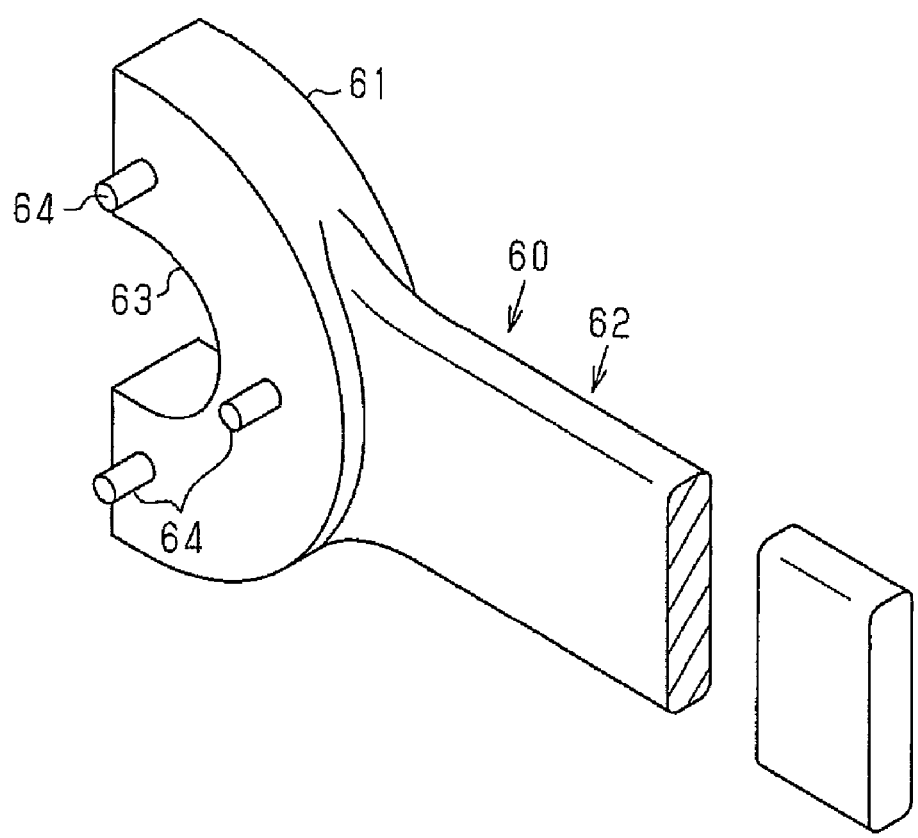
FIG. 6 is a perspective view showing one example of a specialized tool for loosening the threading of the coupling member in the duplex pipe fitting shown in FIG. 1.

Next, the method for loosening the pipe connection that has been fastened as described above using a specialized tool will now be described. In this case, a specialized tool 60 as shown in FIG. 6, for example, is used. This specialized tool 60 has a generally semi-annular shaped base body 61 and a handle 62 attached to the base body 61. The inner diameter of an arc portion 63 of the base body 61 is formed to be a little larger than the outer diameter of the pipe P. On the side face of the base body 61, three engaging projections 64 which are engaged with the engaging holes 51 on the pipe connecting portion 23 are provided. These engaging projections 64 can be engaged with any three adjacent engaging holes of four engaging holes 51 provided on the pipe connecting portion 23.

Three engaging projections 64 of the specialized tool 60 are fit into any three adjacent engaging holes 51 of the pipe connecting portion 23, respectively. Using the handle 62 of the specialized tool 60, the base body 61 is turned to loosen the threading with the fitting main body 1, so that the pipe P can be removed from the fitting main body 1. According to this method for loosening the pipe connection, the pipe P can be removed by loosening the pipe connecting portion 23 without being cut. This facilitates the pipe disconnection work. Also, the pipe P can be removed with the fitting main body 1 left attached. Using a new coupling member 2, the pipe P can be re-connected to the fitting main body 1.

The duplex pipe fitting according to the first embodiment having the above-mentioned configuration has the following advantages (1) To the fitting main body 1 including the first thread portion (internal thread 12a) at either end in the axial direction, the pipe P can be connected at either end. In other words, the fitting main body 1 includes the internal thread cylindrical portion 12 as the first thread portion at either end in the axial direction, which has the cam surface 18 having a pipe connecting mechanism and the internal thread 12a on the inner circumferential surface. The coupling member 2 including the external thread 25a and formed integrally with the ferrule 3 is formed in such a manner as to be threaded to the above-mentioned internal thread 12a. Consequently, the pipe P can be connected to either end of the fitting main body 1 in a biting manner.

(2) In a case where the coupling member 2 is fastened to the fitting main body 1, the pipe P is sealed to the fitting main body 1 and supported to the fitting main body 1 when the rotational torque for tightening the coupling member 2 to the fitting main body 1 reaches a value indicating the completion of fastening. Further, at this time, the tubular coupling portion 27 of the coupling member 2 is cut, the tightening of the coupling member 2 is finished, and the pipe connecting work is complete. Accordingly, after pipe connection, the pipe connecting portion 23 cannot be easily loosened because the holding portion 24 is separated from the pipe connecting portion 23 to be threaded to the fitting main body 1. Consequently, the pipe P cannot be easily removed, and inadvertent leakage and discharge of refrigerant gas into the atmosphere are prevented.

(3) The fitting main body 1 includes the internal thread cylindrical portion 12 as a tubular portion in which the entire pipe connecting portion 23 of the coupling member 2 is accommodated when the fastening is complete. On the other hand, the coupling member 2 is located at a position where the slit 22 substantially coincides with the end portion of the internal thread cylindrical portion 12 as a tubular portion. Therefore, after the holding portion 24 is cut, the remaining pipe connecting portion 23 is entirely accommodated within the fitting main body 1. Consequently, in this embodiment, the thread portion of the pipe connecting portion 23 to the fitting main body 1 is more reliably prevented from being easily loosened or loosened to remove the pipe P by anybody.

(4) On the end face opposite to the fitting main body 1 (rear side) of the pipe connecting portion 23, the plurality of engaging holes 51 are formed Therefore, the pipe connecting portion 23 can easily be loosened by using the specialized tool 60 having the engaging projections 64 which are engaged with the engaging holes 51 The engaging holes 51 are formed as an engaging portion with which the specialized tool 60 is engaged but configured so as not to project to the slit 22 This configuration allows the width of the slit 22 to be reduced, so that the pipe fitting becomes compact (5) The engaging holes 51 are formed in such a manner as to extend in the axial direction. At each position corresponding to the engaging holes 51 on the holding portion 24, machining holes 52 used for machining the engaging holes 51 which pass through the holding portion 24 are formed. Therefore, despite the existence of the holding portion 24, the engaging holes 51 can be machined from the side opposite to the fitting main body 1 (rear side) of the holding portion 24. Also, since the diameter of the machining hole 52 is the same as the diameter of the engaging hole 51, these holes 51, 52 can be machined simultaneously.

(6) Since the engaging holes 51 are spaced at equal intervals on a circumference, the engaging projections 64 provided on the specialized tool 60 can be engaged with any engaging holes 51 of the pipe connecting portion 23. Thus, the specialized tool 60 is easy to use.

(7) The specialized tool 60 includes the base body 61 having the arc portion 63 with an inner diameter larger than the outer diameter of the pipe P, the handle 62 attached to the base body 61 and the engaging projections 64 formed on the side face of the base body 61, which are engaged with the engaging holes 51. Therefore, by using the specialized tool 60, the pipe connecting portion 23 threaded to the fitting main body 1 can be removed without removing the holding portion 24 from the pipe P. This facilitates reconnection of the pipe P.

(8) In a refrigeration system using the above described duplex pipe fitting in a refrigeration circuit, two pipes P can easily be connected, but the connected pipes P cannot easily be removed. Therefore, leakage of refrigerant can be strictly controlled.

Second Embodiment

Figure 7:
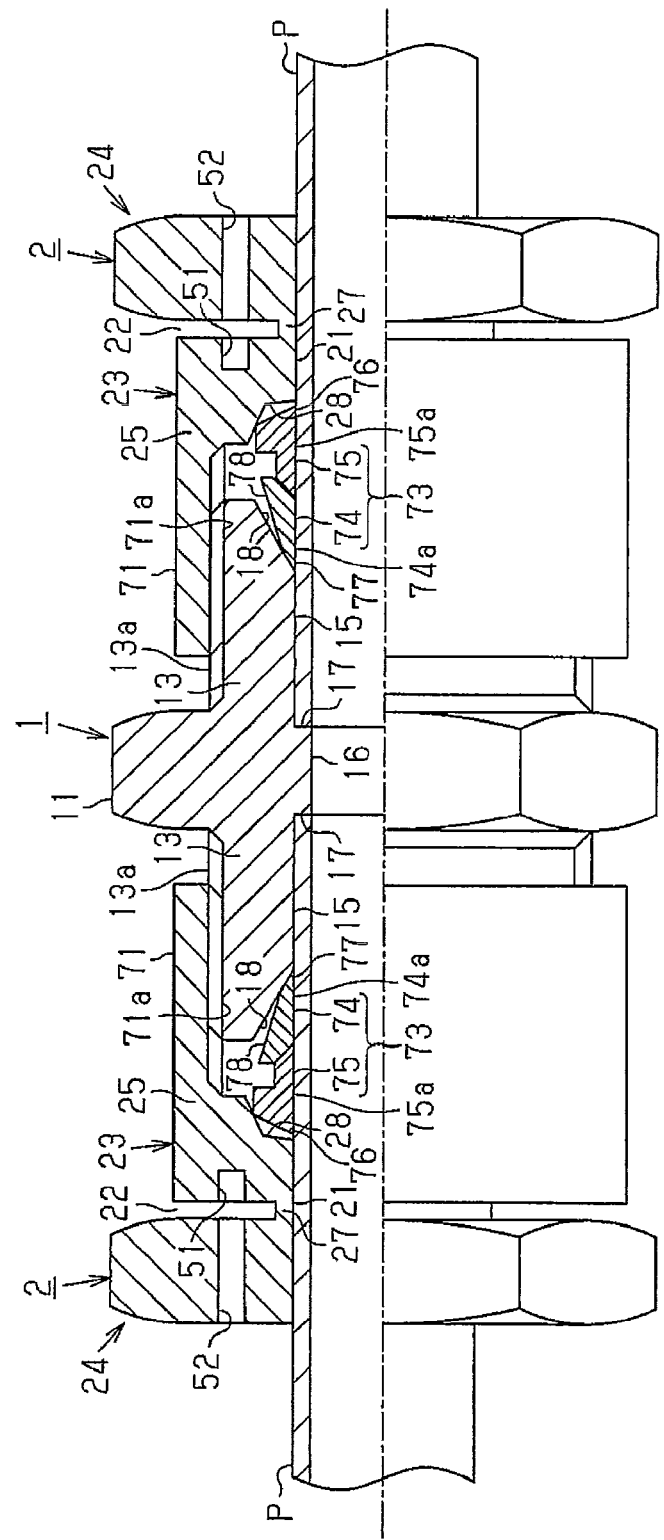
FIG. 7 is a partial cross-sectional view of a duplex pipe fitting according to a second embodiment of the present invention, showing a state when fastening is started.

Next, a second embodiment will now be described with reference to FIG. 7. The second embodiment is different from the first embodiment in that the positions of the internal thread 12*a* and the external thread 25*a* serving as a thread portion of the fitting main body 1 and the coupling member 2 are interchanged and that the ferrule 3 is formed as an independent ferrule which has two divided parts. In FIG. 7, the components that are the same as or correspond to those of the first embodiment are designated by the same reference numerals and their descriptions will be omitted or simplified.

The fitting main body 1 according to the second embodiment includes an external thread 13*a* as a first thread portion formed on the outer circumference surface of a boss 13 formed on either end of a base portion 11, as shown in FIG. 7. Differently from the first embodiment, no tubular portion is formed on the outer circumference of the external thread 13*a*. Also, the coupling member 2 which is threaded to either end of the fitting main body 1 does not have anything like a protective cylindrical portion in the first embodiment. Instead, an internal thread cylindrical portion 71 is formed on the side corresponding to the fitting main body 1 of the base portion 25. The internal thread cylindrical portion 71 includes an internal thread 71*a* as a second thread portion on its inner circumference which is threaded to the external thread 13*a* of the fitting main body 1. The entire outer circumference of the pipe connecting portion 23 is formed in a cylindrical shape.

The ferrule 73 is formed by a front ferrule 74 and a back ferrule 75. In the central axis portion of the front ferrule 74 and the back ferrule 75, pipe through holes 74*a*, 75*a* are formed, respectively. The rear surface of the front ferrule 74 and the front surface of the back ferrule 75 are each formed as an inclined surface, which inclines increasingly toward the central axis as they approach the fitting main body 1 from the rear, and the ferrules 74 and 75 contact each other.

In the duplex pipe fitting having this configuration, when the ferrule 73 is pressed by the pressing surface 28, the edge portion 76 at the rear end of the ferrule 73 bites into the pipe P and the pipe P is supported in the fitting main body 1 and the pipe connecting portion 23. The ferrule 73 is pressed by the pressing surface 28, so that the distal end 77 of front ferrule 74 bites into the pipe P to seal the space between the pipe P and the ferrule 73. At the same time, the outer circumferential tapered surface 78 of the front ferrule 74 closely contacts the cam surface 18, and the space between the ferrule 73 and the cam surface 18 is sealed. FIG. 7 shows a state where tightening of the coupling member 2 has just been started. A state where the edge portion 76 at the rear end and the distal end 77 bite into the pipe P is not shown.

The second embodiment has the above-mentioned configuration and has the following advantages (1) At either end in the axial direction of the fitting main body 1, the cam surface 18 and the external thread 13*a* as the first thread portion are formed. Therefore, by fastening the coupling member 2 attached to the pipe P with the ferrule 73 interposed therebetween to the fitting main body 1, the pipe P can be connected to the fitting main body 1.

(2) In a state after pipe connection is complete, as in the case with the first embodiment, the holding portion 24 is separated from the pipe connecting portion 23 to be threaded to the fitting main body 1. Therefore, the threading of the pipe connecting portion 23 is not easily loosened. Consequently, the pipe P cannot easily be removed, and inadvertent leakage and discharge of refrigerant gas into the atmosphere are prevented.

(3) Further, in the second embodiment, as in the case with the first embodiment, a plurality of engaging holes 51 are formed on the end face opposite to the fitting main body 1 of the pipe connecting portion 23 and machining holes 52 are formed on the holding portion 24. Therefore, the second embodiment has the same advantages as the advantages (4), (5) and (8) in the first embodiment. Also, the specialized tool 60 similar to that in the first embodiment can be used.

Third Embodiment

Next, a third embodiment will now be described with reference to FIG. 8. The third embodiment is basically different from the second embodiment in that a flare type pipe connecting mechanism is used. In this figure, the components that are the same as or correspond to those of the second embodiment are designated by the same reference numerals and their descriptions will be omitted or simplified.

Figure 8:
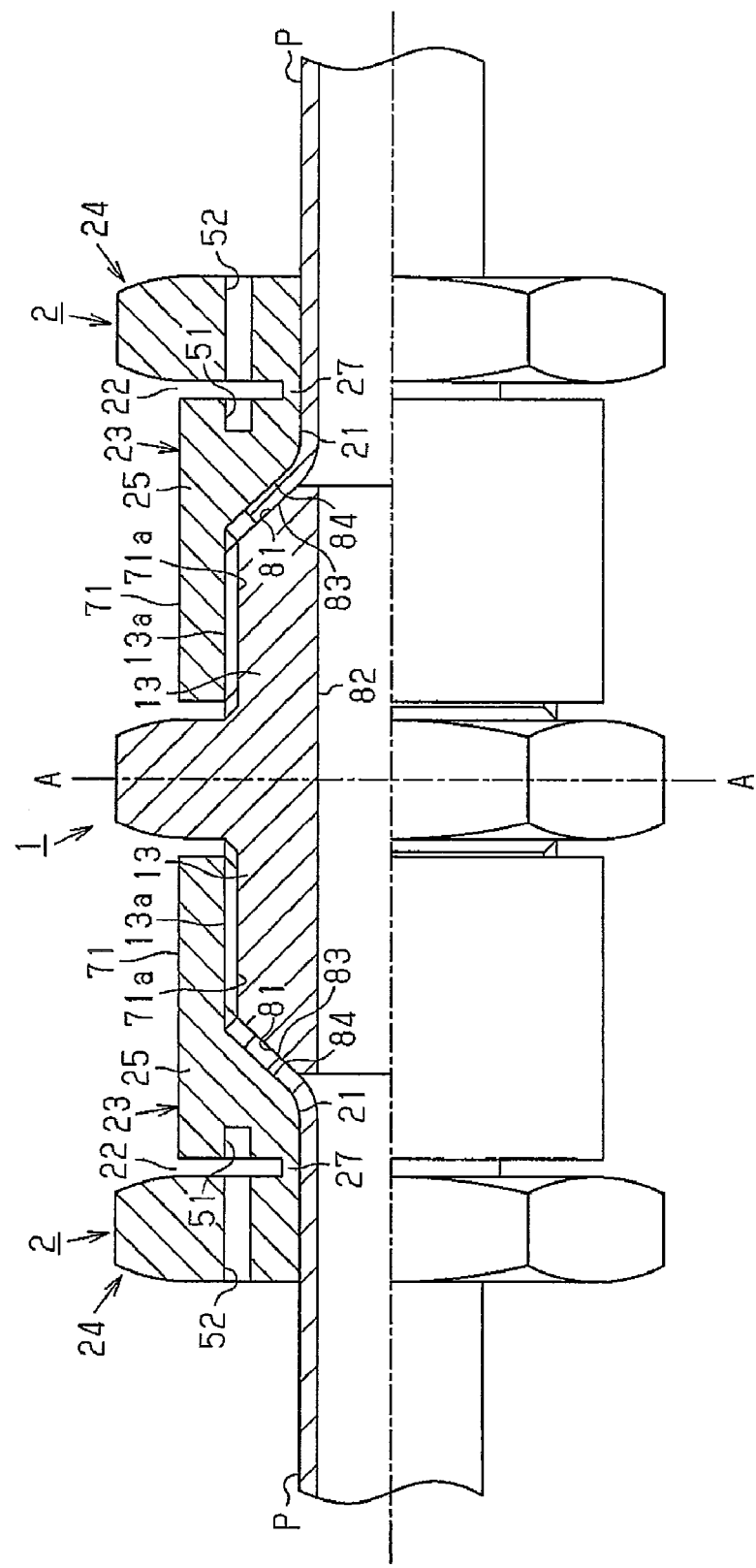
FIG. 8 is a partial cross-sectional view of a duplex pipe fitting according to a third embodiment of the present invention, showing a state immediately before the fastening is complete.

The fitting main body 1 according to the third embodiment has a flared receiving surface 81, instead of a cam surface, formed at the distal end of the boss 13, as shown in FIG. 8. Further, in the central axis of the boss 13, a communication hole 82 which connects the bosses 13 provided at both ends to each other and has an inner diameter almost the same as that of the pipe P is formed.

On each of the pair of coupling members 2 threaded to the either end of the fitting main body 1, as in the case with the second embodiment, the pipe connecting portion 23 is formed on the side corresponding to the fitting main body 1 with the slit 22 interposed therebetween, and the holding portion 24 is formed on the side opposite to the fitting main body 1. The pipe connecting portion 23 has, on the side corresponding to the fitting main body 1 of the base portion 25, the internal thread cylindrical portion 71 with the internal thread 71a formed on the inner circumferential surface. The pipe connecting portion 23 has a flared pressure surface 84 formed on the end face of the side corresponding to the fitting main body 1 of the base portion 25. The flared pressure surface 84 is pressed against a flare 83 formed on the pipe P.

The flare type pipe fitting having the above-mentioned configuration is connected in the procedure mentioned below. First, the pipe P is inserted into the pipe through hole 21 of the coupling member 2, so that the pipe P is attached to the coupling member 2. Thereafter, the flare 83 is formed at the distal end of the pipe P using a separate tool. Next, pressing the flare 83 against the flared receiving surface 81, the coupling member 2 is tightened to the fitting main body 1. When the rotational torque for tightening the coupling member 2 reaches a value indicating the completion of fastening, the flare 83 gets caught between the flared receiving surface 81 and the flared pressure surface 84, as shown in FIG. 8. Almost at the same time, the holding portion 24 (not shown) is separated, so that the fastening of the coupling member 2 is finished and the pipe connection is complete. At this time, since the outer circumference of the pipe connecting portion 23 is formed in a cylindrical shape, the pipe connecting portion 23 cannot be held with a general fastening tool. Therefore, threading of the fitting main body 1 and the pipe connecting portion 23 cannot be loosened. The specialized tool 60 as shown in FIG. 6 is used to loosen threading of the fitting main body 1 and the pipe connecting portion 23.

The third embodiment shows that the present invention is also applicable to such a case where the fitting main body 1 and the coupling member 2 have different pipe connecting mechanisms, and it has the same advantages as those of the invention according to the second embodiment.

Fourth Embodiment

Figure 9:
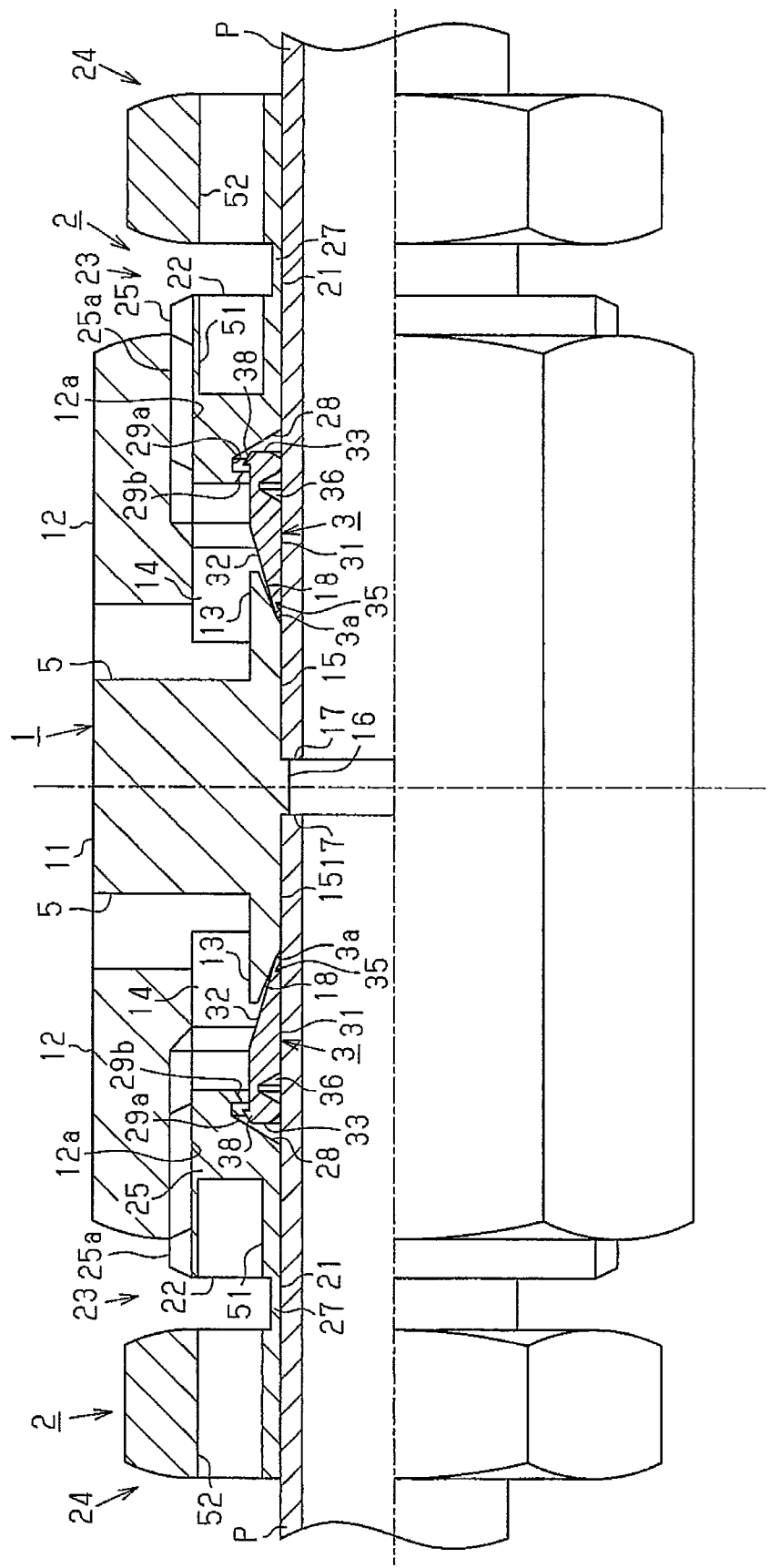
FIG. 9 is a partial cross-sectional view of a duplex pipe fitting according to a fourth embodiment of the present invention, showing a state when fastening is started.
Figure 10:
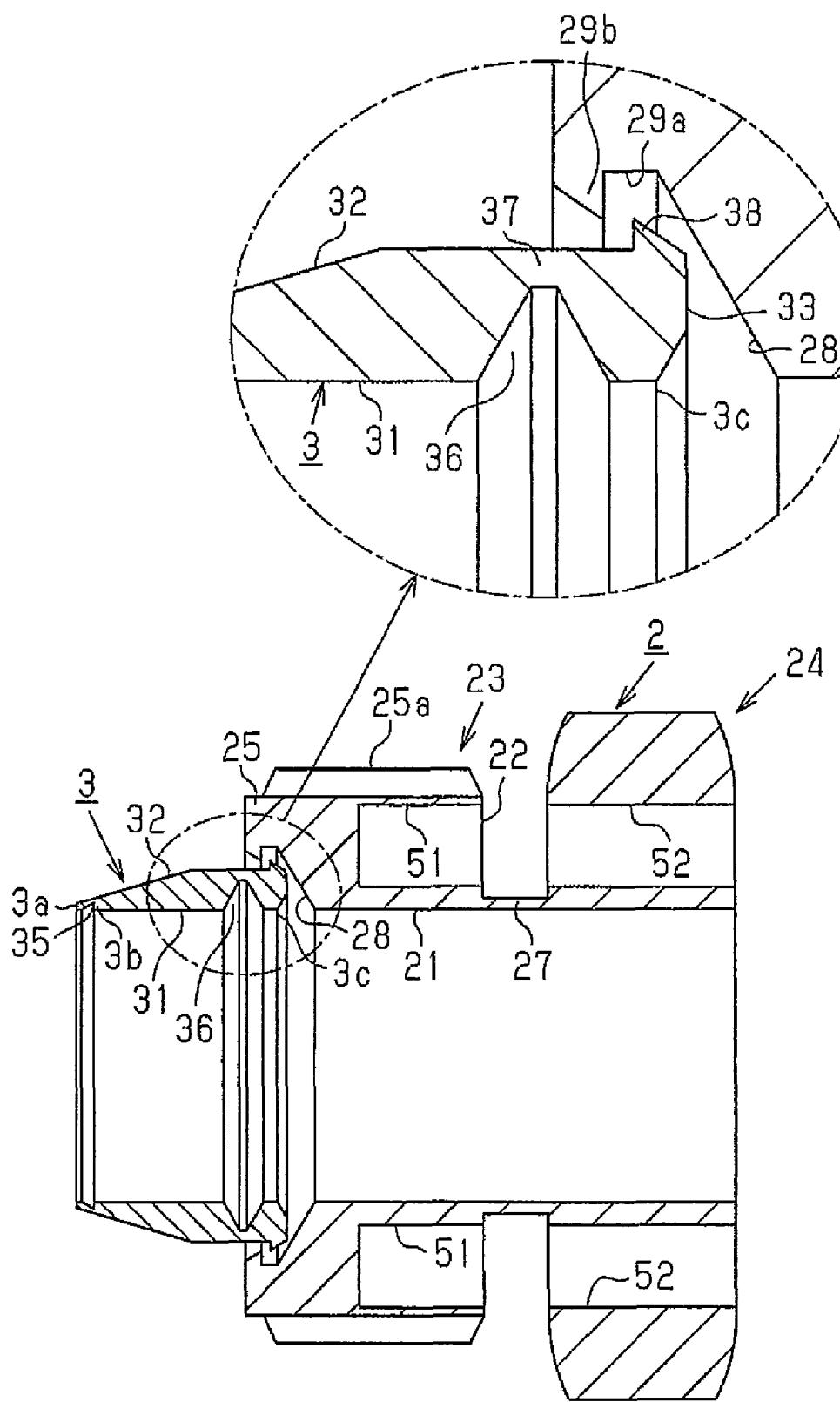
FIG. 10 is a cross-sectional view of the duplex pipe fitting shown in FIG. 9, illustrating a state in which the ferrule is temporarily held by the coupling member.
Figure 11:
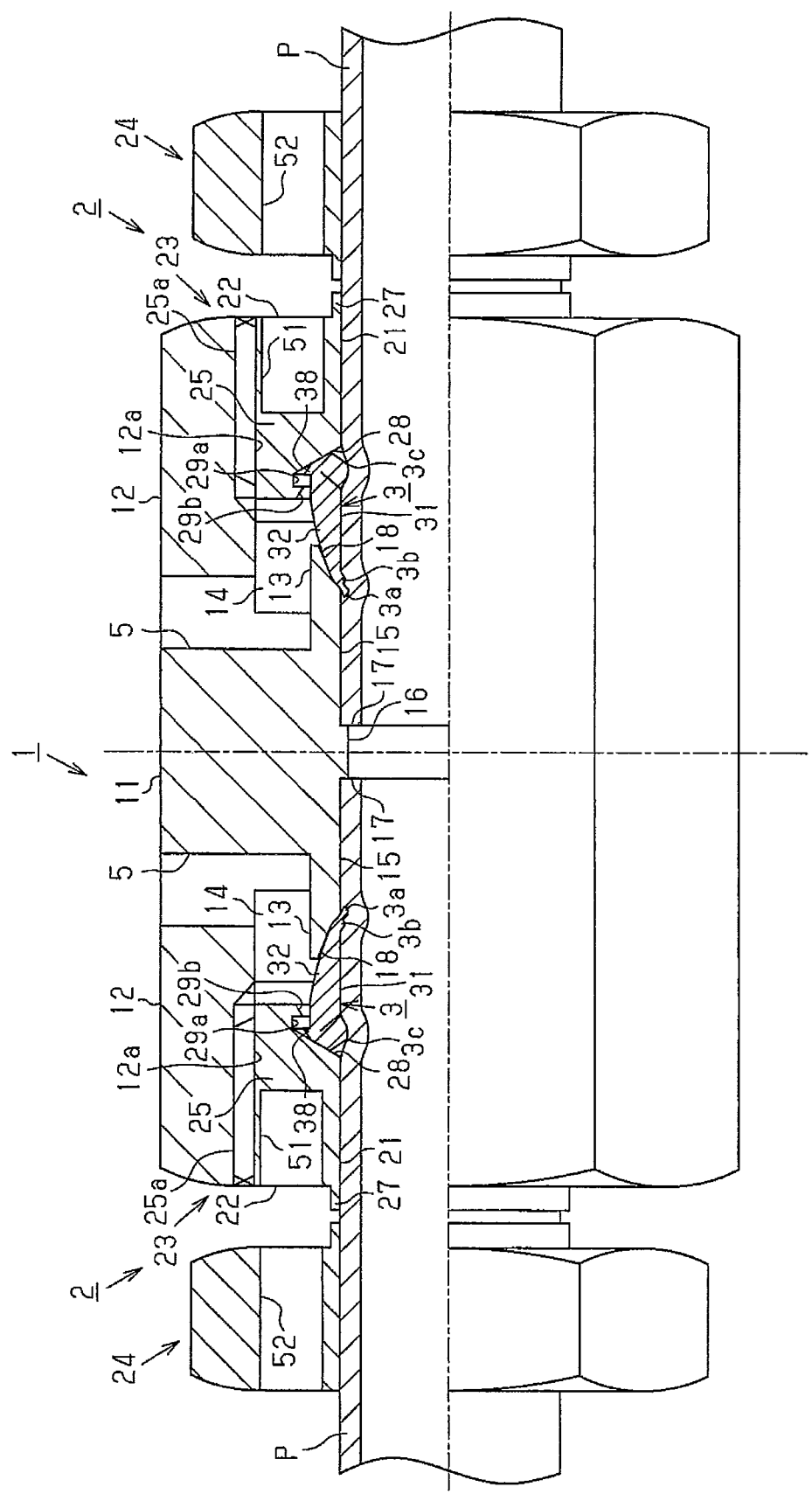
FIG. 11 is a cross-sectional view illustrating a state in which pipe connecting using the duplex pipe fitting shown in FIG. 9 is complete.

Next, a duplex pipe fitting according to a fourth embodiment will now be described with reference to FIGS. 9 to 11. The fourth embodiment is different from the first embodiment in dimensions of each portion. In addition, in the fourth embodiment, a ferrule 3 is formed separately from the coupling member 2 and the ferrule 3 is temporarily held to the coupling member 2 before being assembled. FIG. 9 is a cross-sectional view of a duplex pipe fitting according to the fourth embodiment, showing a state when fastening is started. FIG. 10 is a cross-sectional view of the same duplex pipe fitting, showing a state when the ferrule is temporarily held to the coupling member. FIG. 11 is a cross-sectional view of the same duplex pipe fitting, showing a state after pipe connecting is complete. In FIGS. 9 to 11, the components that are the same as or correspond to those of the first embodiment are designated by the same reference numerals and their descriptions will be omitted or simplified.

The duplex pipe fitting according to the fourth embodiment is basically the same as the first embodiment, except for the above-mentioned differences. In the fourth embodiment, the fitting main body 1 includes no protective cylindrical portion 26 like the one in the first embodiment formed to the coupling member 2. Therefore, the axial length of the annular space 14 is shorter than that of the first embodiment. On the duplex pipe fitting according to this embodiment, a release port 5 is formed, through which the space (including the annular space 14) formed between the fitting main body 1 and the coupling member 2 when they are threaded to each other communicates with the outside. In a case where the space is cooled and water in the air freezes inside, the release port 5 releases an expansion force of ice caused by freezing to the outside.

The pipe connecting portion 23 of the coupling member 2 includes a temporary holding mechanism for temporarily holding the ferrule 3 formed as a separate part, as shown in FIG. 10. The pressing surface 28 for pressing the rear end of the ferrule 3 is formed on the pipe connecting portion 23. Also, a large diameter portion 29a is formed forward of the pressing surface 28. Further, forward of the large diameter portion 29a, an annular projection 29b projecting radially inward formed. The large diameter portion 29a and the projection 29b constitute a temporary holding mechanism of the coupling member 2. The inner diameters of the engaging holes 51 and the machining holes 52 in this embodiment are larger than those of the engaging hole 51 and the machining hole 52 in the first embodiment. Accordingly, the engaging projections 64 of the specialized tool 60 used for this duplex pipe fitting (see FIG. 6 according to the first embodiment) which are inserted in the engaging holes 51 need to have a larger diameter.

At the rear end of the ferrule 3, an annular projection 38 projecting radially outward is formed as a temporary holding mechanism The projection 38 has an outer diameter which is slightly larger than the inner diameter of the annular projection 29b of the coupling member 2 and smaller than the inner diameter of the large diameter portion 29a In addition, the axial length of the projection 38 is shorter than the axial length of the large diameter portion 29a In the ferrule 3 having this configuration, by pressing the projection 38 at the rear end against the projection 29b of the coupling member 2, the projection 38 is pressed in the large diameter portion 29a, as shown in FIG. 10. As a result, the projection 38 is held in the large diameter portion 29a as long as it is not pulled strongly, so that the ferrule 3 is temporarily held to the coupling member 2.

The coupling member 2 to which the ferrule 3 is temporarily held is attached to the pipe P with the ferrule 3 being temporarily held, and the coupling member 2 is tightened manually so that the distal end of the ferrule 3 contacts the cam surface 18 (see FIG. 9). This is a state where fastening is started. Continuously, when the coupling member 2 is tightened manually, the distal end 3a of the ferrule 3 is pressed in a wedge-like fashion between the pipe P and the insertion port 15 as described above, so that the pipe P is temporarily held. Thereafter, when the coupling member 2 is tightened using a fastening tool, the pipe P is fastened to the fitting main body 1 as in the case with the first embodiment (see FIG. 11).

Since the fourth embodiment has the above-mentioned configuration, it has the same advantages as the first embodiment. In this embodiment, the release port 5 is formed on the fitting main body 1. Therefore, even if moisture in the air freezes in the space including the annular space 14 formed between the fitting main body 1 and the coupling member 2, the expansion force of ice is released to the outside through the release port 5. Consequently, the sealing performance is not degraded by freezing of moisture in the air.

Figure 12:
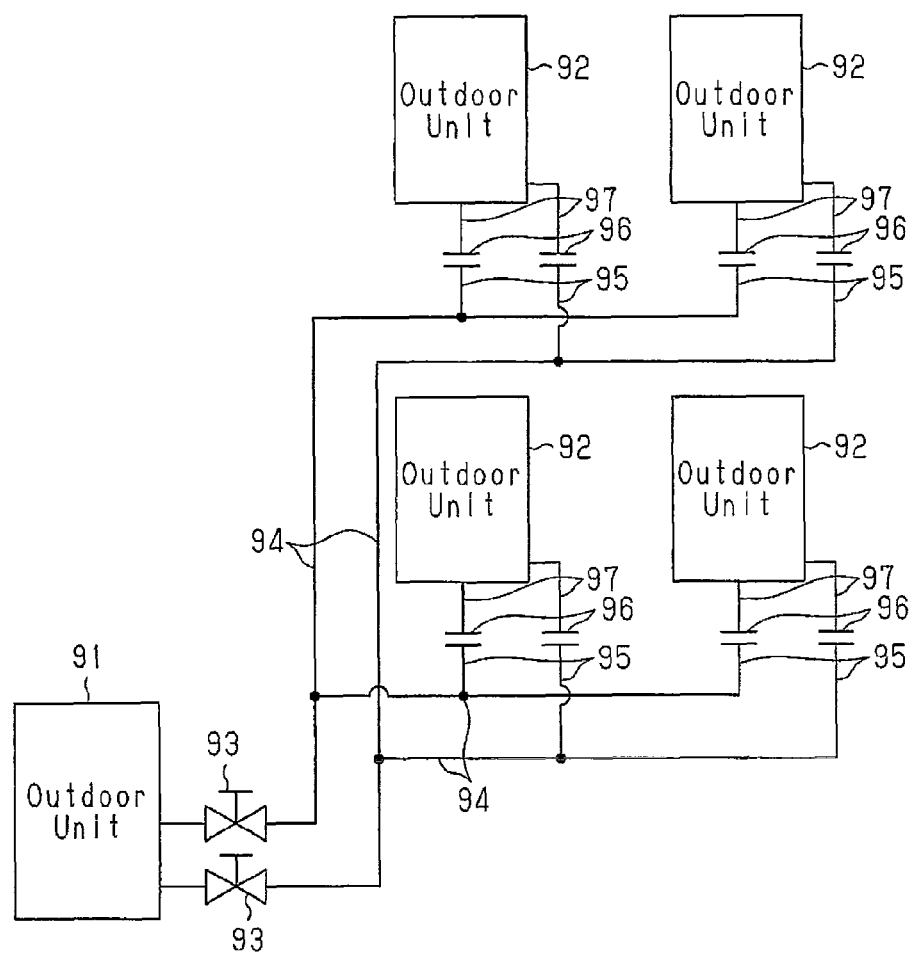
FIG. 12 is a block diagram showing a piping system of a separation type air conditioner according to a modified embodiment.
Figure 13:
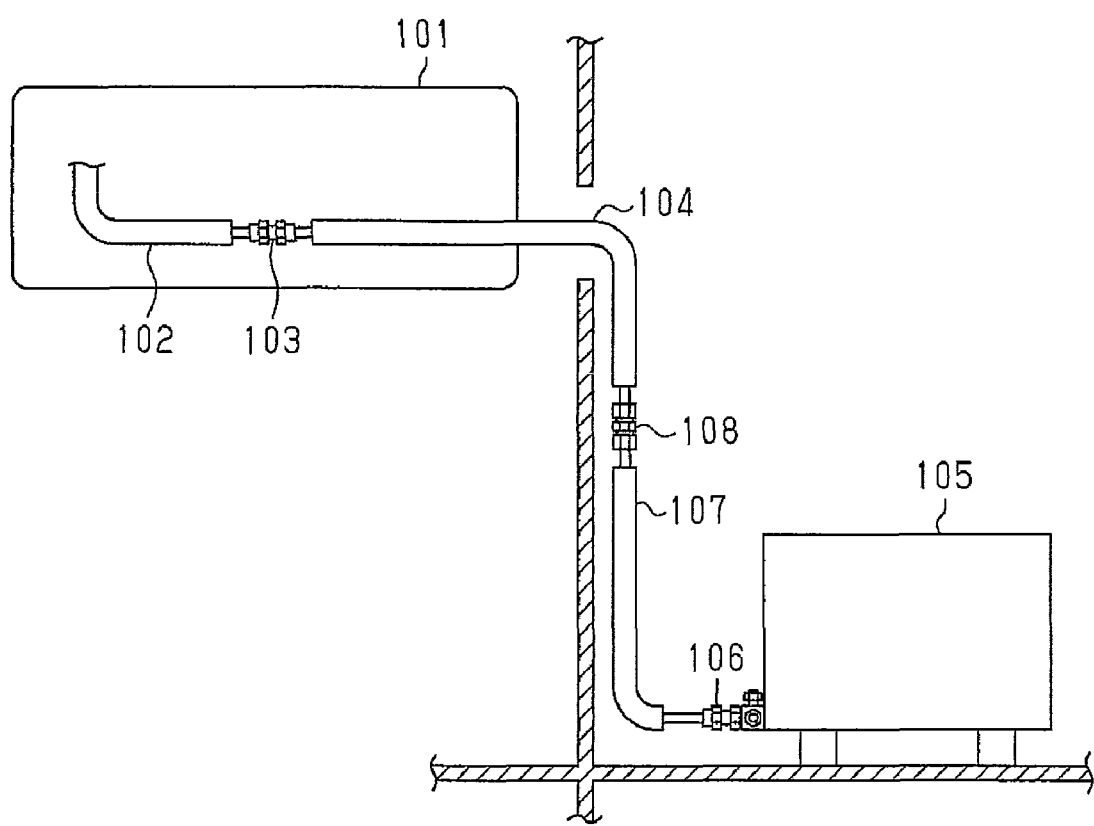
FIG. 13 is a diagram showing a piping system of a conventional separation type air conditioner.

Next, a multi-split separation type air conditioner according to a modified embodiment of a duplex pipe fitting of the embodiments mentioned above will now be described with reference to FIG. 12.

In this separation type air conditioner, HC (hydro carbon) refrigerant such as propane is used. FIG. 12 shows a schematic view of the piping system. As shown in the figure, this separation type air conditioner includes one outdoor unit 91 and a plurality of (four, in this case) indoor units 92 connected to the outdoor unit 91. The indoor unit 92 is a ceiling-embedded type unit installed above the ceiling. At the inlet and outlet of the outdoor unit 91, shut-off valves 93 are installed respectively, and main communication pipes 94 are connected to the shut-off valves 93 in the on-site piping installation works. Further, branch pipes 95 are branched and connected to the main communication pipes 94 in the on-site piping installation works. Each branch pipe 95 is connected to a connecting portion 97 on the pipes drawn out of the indoor units 92 using a duplex pipe fitting 96. In this manner, each indoor unit 92 is connected in parallel to the outdoor unit 91 through the main communication pipe 94, the branch pipe 95 and the duplex pipe fitting 96.

In the above configuration, the duplex pipe fitting 96 employs a bite type pipe connecting structure according to any of the embodiments described above. Accordingly, in a case where the indoor unit 92 is installed above the ceiling, the pipe cannot easily be disassembled. Brazing of pipes for preventing the pipes from being easily disassembled is not required. Therefore a safe piping installation work can be performed.

The present invention may be modified as follows (1) Each of the embodiments described above describes only the configuration where the tubular coupling portion 27 is separated by transmitting the rotational torque to the tubular coupling portion 27 when the coupling member 2 is fastened, but the configuration may be modified as mentioned below. When the rotational torque for fastening the coupling member 2 reaches a value indicating the completion of fastening, the sealing performance and holding force of the pipe P are fully delivered, so that tightening of the coupling member 2 to the fitting main body 1 is finished. At this time, the tubular coupling portion 27 is not separated yet, and the coupling member 2 can be additionally tightened. In this case, the rotational torque is controlled based on the rotation angle of the coupling member 2 or the position of the coupling member 2, as in the conventional case. Thereafter, by exerting an axial force to the holding portion 24, the tubular coupling portion 27 is separated. The force may be exerted by tapping the holding portion 24 in the axial direction with a fastening tool or by repeatedly pulling or bending the holding portion 24 pinched with a tool such as pliers in the longitudinal direction of the central axis. In any case, pipe connecting work is complete after the separation process of the tubular coupling portion 27. The tubular coupling portion 27 is formed as a portion that integrally connects the pipe connecting portion 23 and the holding portion 24, but it is not limited to such an integrally formed configuration and it may be formed as a separate portion. In this case, the pipe connecting portion 23 and the holding portion 24 may be connected by connecting means such as an adhesive through the separate tubular coupling portion.

(2) In each embodiment, as another method for removing the pipe connecting portion 23, a method in which no engaging hole 51 is provided may be adopted. In this case, the machining holes 52 provided on the holding portion 24 can be omitted.

(3) In each embodiment, the pipes connected at both ends of the duplex pipe fitting have the same size, but the duplex pipe fitting may be used for the pipes which have different outer diameters.

(4) In each embodiment, the holding portion 24 is configured so that it is separated entirely However, the configuration is not limited to such a configuration as long as at least a portion including the holding surface is separated (5) In each embodiment, the outside shape of the holding portion 24 is a hexagon nut shape so that it can be held with a general fastening tool. On the other hand, the holding portion 24 may have a different shape as long as it has a polygonal shape so that it can be held with a general fastening tool. For example, the holding portion may be a quadrangle.

The invention claimed is:

1. A duplex pipe fitting comprising a fitting main body having a pair of first thread portions and a pair of coupling members having second thread portions which are threaded to the respective first thread portions of the fitting main body while being attached to pipes to be connected to the fitting main body, each of the coupling member being threaded to the fitting main body so that two pipes are connected to each other with the fitting main body,
wherein each of the coupling members has a holding portion including a holding surface formed of a pair of or a plurality of pairs of planes facing each other, the holding portion being capable of being held with a general fastening tool,
wherein at least a part of the holding portion including the holding surface is separated from the coupling member in the course of pipe connecting,
wherein the coupling member includes a pipe through hole extending along a central axis, a slit formed on the entire circumference of the coupling member in such a manner as to divide the coupling member into two parts, and a thin-wall tubular coupling portion formed between the slit and the pipe through hole,
wherein a portion of the coupling member that is on a side opposite to the fitting main body of the slit is formed as the holding portion, and a portion of the coupling member that is on the same side as the fitting main body of the slit is formed as a pipe connecting portion, the pipe connecting portion including the thread portions that are threaded to the fitting main body and constituting a pipe connecting mechanism for hermetically joining the fitting main body and the pipe,
wherein the part including the holding surface is separated from the coupling member at the tubular coupling portion when the rotational torque for tightening the coupling member to the fitting main body reaches the value indicating the completion of fastening, and
wherein the fitting main body has a cylindrical portion in which the entire pipe connecting portion is accommodated in a state after the fastening is complete, and the coupling member is located at a position where the slit substantially coincides with the end of the cylindrical portion in a state after the fastening is complete.

2. The duplex pipe fitting according to claim 1, wherein a plurality of engaging holes are formed on an end face opposite to the fitting main body of the pipe connecting portion.

3. The duplex pipe fitting according to claim 2, wherein the plurality of engaging holes are formed in such a manner as to extend in the axial direction, wherein a plurality of machining holes used for machining the plurality of engaging holes pass through the holding portion, the machining holes being formed at positions corresponding to the engaging holes on the holding portion.

4. The duplex pipe fitting according to claim 3, wherein the plurality of engaging holes are spaced at equal intervals on a circumference.

5. The duplex pipe fitting according to claim 2, further comprising a specialized tool that includes a generally semi-annular shaped base body which has an inner diameter larger than the outer diameter of the pipe, a handle attached to the base body and engaging projections formed on the side face of the base body, which are engaged with the engaging holes.

6. A refrigeration system, wherein the duplex pipe fitting according to claim 1 is used in a refrigerant circuit.

7. A separation type air conditioner, wherein an indoor unit installed in a room and an outdoor unit installed outside a room are connected to each other with a communication pipe installed on site, wherein the communication pipe is connected with the duplex pipe fitting according to claim 1.

8. A separation type air conditioner, wherein an indoor unit installed above a ceiling and an outdoor unit installed outside a room are connected to each other with a communication pipe installed on site, wherein the communication pipe is connected above the ceiling with the duplex pipe fitting according to claim 1.

* * * * *